(No Model.) 2 Sheets—Sheet 1.

E. P. SHARP.
TROLLEY WIRE HOLDER.

No. 445,908. Patented Feb. 3, 1891.

WITNESSES
H. L. Coburn
W. A. Martin

INVENTOR
Edward P. Sharp
By Charles Carr
atty (No Model.) 2 Sheets—Sheet 2.

E. P. SHARP.
TROLLEY WIRE HOLDER.

No. 445,908. Patented Feb. 3, 1891.

WITNESSES:
H. L. Coburn
W. A. Martin

INVENTOR
Edward P. Sharp
By Charles Carr
Attorney

UNITED STATES PATENT OFFICE.

EDWARD P. SHARP, OF BOSTON, MASSACHUSETTS.

TROLLEY-WIRE HOLDER.

SPECIFICATION forming part of Letters Patent No. 445,908, dated February 3, 1891.

Application filed September 25, 1890. Serial No. 366,147. (No model.)

*To all whom it may concern:*

Be it known that I, EDWARD P. SHARP, of the city of Boston, county of Suffolk, and State of Massachusetts, have invented an Improved Trolley-Wire Holder, of which the following is a full and exact description, taken together with the accompanying drawings, as referred to by means of letters of reference.

The nature of my invention relates to a device applied directly to the trolley-wire and along it at suitable intervals to support and hold it in the required position.

The device consists, mainly, of a thin metal wrap provided with suitably-formed extremities in the transverse direction and about midway of its length. These extremities are so formed as to fit together at the top of the wire when the thin part is wrapped around the wire from beneath. They may be secured together at the top in various ways, one of the best of which is shown in Figures 1, 2, and 4, where these transverse extremities are shown to meet, thus forming a single joint, another in Fig. 9, a third in Figs. 10 and 11, and a fourth is shown in Fig. 5.

In the drawings, Fig. 1 is a transverse vertical sectional view. Fig. 2 is a corresponding side elevation. Fig. 3 is a transverse vertical section of the principal piece and of the trolley-wire at a stage of the process of applying the holder to the wire. Fig. 4 is a plan. Fig. 5 is a transverse vertical sectional view. Fig. 6 is a transverse section at *a a*. Fig. 7 is a transverse vertical sectional elevation. Fig. 8 is a side elevation. Fig. 9 is a plan. Fig. 10 is also a plan. Fig. 11 is a side elevation. Fig. 13 is a perspective view showing the tongue and groove in the thickened transverse parts. Fig. 14 is a similar view showing tongues and grooves arranged in two directions. Figs. 17, 18, and 19 are elevations showing other modifications of the tongue and groove. Fig. 16 is an elevation showing in broken lines a steady-pin and socket. Fig. 12 is a plan of the device before bending up around the wire, and also showing the steady-pin and socket. The wire is also shown about which the device is to be bent. Fig. 15 is an end view of the same.

Figure 9:
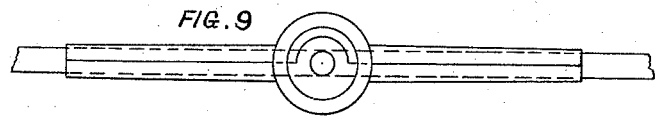
Figure 10:
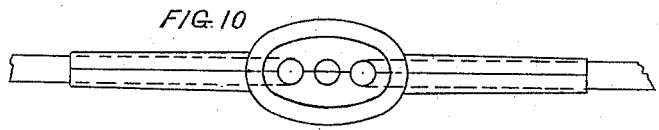
Figure 6:
Figure 11:
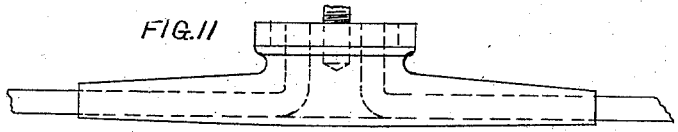

The modified construction shown in Fig. 9 furnishes a full screw-socket in a solid part undivided, and in Figs. 10 and 11 I show how my device may be used to couple the wires at a joint.

Figure 1:
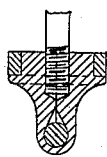
Figs. 1 and 2 represent the usual construction.
Figure 3:
Figure 4:
Figure 5:
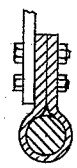
Figure 7:
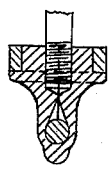
Figs. 7 and 8 show the longitudinal rib underneath, hereinafter more fully described.
Figure 8:
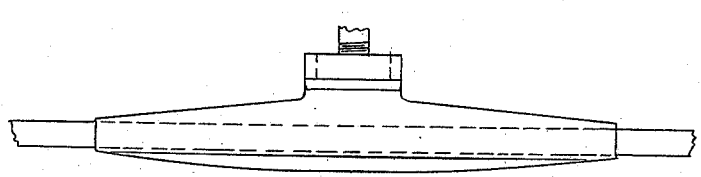
Figure 13:
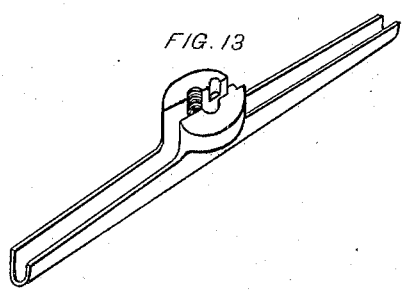
Figure 14:
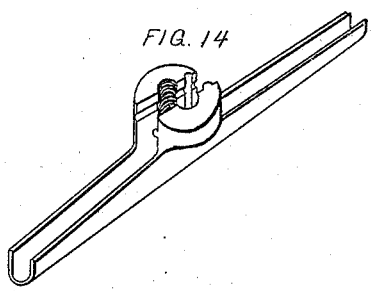
Figure 16:
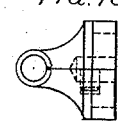
Figure 15:
Figure 12:
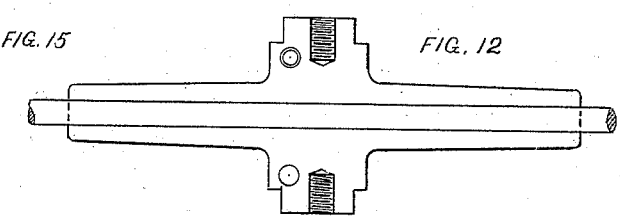
Figure 17:
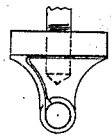
Figure 18:
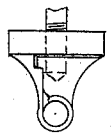
Figure 19:
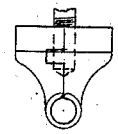

The metal used may be cast nearly or quite in the desired shape ready for bending and should be sufficiently ductile to be readily bent from a flat shape or from a shape similar to that in Fig. 3 into the position and form shown with the wire inclosed in Figs. 1, 5, and 7. To allow the trolley-wheel to pass without fear of too much wear and chafing of the sides, a longitudinal rib, as shown in Figs. 7 and 8, may be cast in line with the resting-place of the wire. This rib will cause the trolley and trolley-arm to fall gradually and slightly and gradually to ascend during the passing of the trolley-wheel, the retaining-flanges of which flare outwardly to a slight degree.

Figure 2:
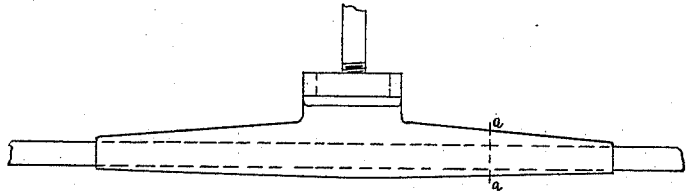

As shown in Figs. 1, 2, and 7, the threaded rod from the insulator or other support is screwed into a nut or threaded hole, which is partly in one part or upward extremity and partly in the other.

If it is preferred or found more convenient or satisfactory in practice, the screw-socket may be made wholly in one part, as in Fig. 9. The parts or upward extremities may be provided with interlocking parts like "tongue and groove" or a "steady-pin" and "socket" to prevent the possible slight displacement with respect to each other of the screw-threads in one part and the other, or the disagreement of the top surface of each in respect to the other. Ordinarily it is preferred to secure the extremities meeting at the top by means of a ring forced down over and inclosing them, as shown in Figs. 1, 2, 4, 8, 9, 10, and 11. Bolts, however, and other methods may be applied, as see, for instance, illustration Fig. 5.

This device has the merits of great simplicity, security, strength, durability, neatness, compactness, causing slight disturbance at the passing of the trolley, is easily applied and removed, and is not expensive.

I claim—

1. The trolley-wire holder constructed substantially as described, viz: having a thin central part extending along the wire, bending upward around and inclosing the wire, and having at each transverse or upwardly-bent extremity a part, each fitted to the other and clamped together, and fitted to receive the attachment connecting it to the insulator or other support.

2. A trolley-wire holder whole at the bottom beneath the wire and on either side, but separable by a single joint at the top to receive the wire, substantially as described.

3. A trolley-wire holder wrapping the wire from beneath and having the two transverse extensions bent upward and closed together above the wire and there fastened together and attached to the insulator or other support, substantially as described.

4. The trolley-wire holder having a broad thin part wrapped around the wire from beneath and having the upper ends brought together in cylindrical form with vertical axis and inclosed in a ring and tapped to receive vertically and centrally a screw connecting it to the insulator or other support, substantially as described.

5. The trolley-wire holder having a broad central part made thin, except that it is provided with a rib running lengthwise in respect to the wire and beneath it, said broad thin part being wrapped from beneath with the rib outside and at the bottom upward around and inclosing the wire and having the extremities which are thus brought together at the top fitted and provided with means of attachment to the insulator or other support, substantially as described.

6. The trolley-wire holder having a thin ductile wire-supporting loop beneath and extended along lengthwise the wire and transverse thicker extensions meeting above the wire, and upwardly-turned or angled continuations of the wire socket to receive the angularly-bent ends of the wire which come from opposite directions into the holder and turn upward into said upturned socket continuations, substantially as described.

EDWARD P. SHARP.

Witnesses:
F. M. HOOPER,
H. L. COBURN.